INVENTORS:
FELIKS BITNERS, HANS WALTER BRANDT, ARNOLD HAUSWEILER, ADOLF MAYER.

United States Patent Office 3,507,755
Patented Apr. 21, 1970

3,507,755
PROCESS FOR THE PURIFICATION OF ACRYLO-NITRILE BY DISTILLATION WITH SIDE STREAM WITHDRAWAL AND DECANTATION
Feliks Bitners, Leverkusen, Hans-Walther Brandt, Cologne-Flittard, and Arnold Hausweiler and Adolf Mayer, Dormagen, Germany, assignors to Farbenfabriken Bayer Aktiengesellschaft, Leverkusen, Germany, and Erdolchemie Gesellschaft mit beschrankter Haftung, Dormagen, Germany
Filed Oct. 4, 1968, Ser. No. 765,055
Claims priority, application Germany, Oct. 17, 1968,
F 53,801
Int. Cl. B01d 3/00; C07c 121/32
U.S. Cl. 203—84                6 Claims

ABSTRACT OF THE DISCLOSURE

A crude acrylonitrile mixture obtained from the oxidation of propylene in the presence of ammonia and containing hydrocyanic acid, water and organic compounds including acetone are distilled recovering hydrocyanic overhead, acrylonitrile as a sump product and a side stream below the feed point is withdrawn phase separated and the organic phase is reutrned to the distillation column. In some cases the sump product can be further distilled in a separate column wherein said stream removal and decantation is repeated. In another embodiment, a vapor side stream is removed from a first column at a point above the liquid side stream to be decanted, and distilled in a second column and the bottoms from the second column is recycled to the first column at a point adjacent the vaporized side stream.

---

Figure 1:
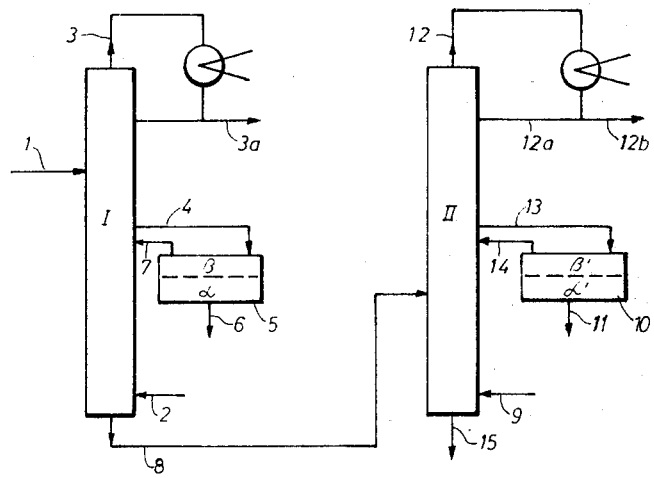

Process for the purification of a crude product containing acrylonitrile, hydrocyanic acid and water, such as obtained from the oxidation of propylene in the presence of ammonia, by distillation in a column provided with a heated sump characterized by withdrawing substantially all of the liquid from the column at an intermediate point, allowing the withdrawn liquid to separate into an upper organic and a lower aqueous phase, recycling the upper organic phase to the column at a point below the point of liquid withdrawal, recovering hydrocyanic acid from the overhead and recovering acrylonitrile from the sump product, preferably by distilling the sump product in a second distillation column provided with a heated sump, with withdrawal of substantially all of the liquid from the second column at an intermediate point, allowing separation into an upper organic and a lower aqueous phase, recycling the upper organic phase to the second column at a point below the point of liquid withdrawal and recovering the acrylonitrile from the sump of the second column. preferably by distillation. The bottom product from the first column is preferably introduced into the second column at an intermediate point below the point of liquid withdrawal. The hydrocyanic acid is preferably drawn off from the overhead of the first column and acetone and lower boiling secondary products from the head of the second column. In place of use of the second column, an upper fraction may be withdrawn between the column head and point of liquid withdrawal in the first column and passed to a further column for distilling off lower boiling products and recycling the bottom product to the first column, preferably a little above the point of liquid withdrawal.

This invention relates to a process for the purification of acrylonitrile.

In the manufacture of acrylonitrile by oxidising propylene in the presence of ammonia, the main product acrylonitrile is obtained from the reaction gas, usually following separation of acetonitrile by extractive distillation, in admixture with substantial quantities of hydrocyanic acid, small quantities of other compounds, such as acetone and propionitrile and as much water as the organic compounds are able to dissolve. This crude product is then treated in several distillation stages in order to obtain pure acrylonitrile and pure hydrocyanic acid. In conventional processes, the coposition of this crude product fluctuates between 60% and 80% by weight of acrylonitrile, from 10 to 25% by weight of hydrocyanic acid, from 0.2 to 1.0% by weight of acetone, from 6 to 10% by weight of water and from 1 to 2% by weight of other organic compounds.

In the process described in Belgian Patent No. 591,349, a dilute aqueous solution of acrylonitrile and secondary products is treated in a distillation apparatus. Following condensation of the waste vapours, a crude product is obtained which is separated into an aqueous phase and an organic phase by decanting. In order to separate off high-boiling fractions, the organic phase containing about 6 to 10% by weight of water in solution, is distilled overhead in a second column, the waste vapours being introduced into a third column in which hydrocyanic acid is run off overhead, acrylonitrile and water remaining in the sump. An aqueous phase is separated off in a separating bottle, while an acrylonitrile saturated with water, i.e. still containing about 5% by weight of water, is obtained in the organic phase. The acrylonitrile thus obtained has then to be dried and purified in another distillation stage which has not yet been described.

One major disadvantage of this process is that the water is entrained throughout the entire distillation cycle. This not only wastes considerable energy, but also interferes with purification of the acrylonitrile because the aldehyde cyanhydrins inevitably present in each distillation stage, acrolein cyanhydrins in particular, are split up into aldehyde and hydrocyanic acid in the presence of water, contaminating the acrylonitrile.

The same disadvantage is present in a process for the purification of crude acrylonitrile described in French patent specification No. 1,377,939. In this case, hydrocyanic acid is drawn off overhead from the crude product in a first column, the aqueous phase is separated off from the bottom product consisting of two phases and the acrylonitrile saturated with water is introduced into the next column in which all the water dissolved in acrylonitrile has to be distilled off azeotropically with acrylonitrile.

In the process described in German Auslegeschrift No. 1,125,911, just as in the process described in Belgian patent specification No. 591,349, the water is entrained through all the purification stages up to the pure acrylonitrile column. A similar procedure is adopted in the process disclosed in Austrian patent specification No. 236,357, in which to remove aldehydes, the crude product is treated with alkali and then distilled; hydrocyanic acid is drawn off overhead, acrylonitrile and water are left distilled off in the sump of the column, while cyanhydrins remain in the sump. In a third column, the wet acrylonitrile is dried by distillation by distilling water with acrylonitrile azeotropically overhead and retaining in the sump dry acrylonitrile which then has to be purified in a fourth column.

U.S. patent specification No. 3,149,055 relates to a process in which an acrylonitrile containing water and acetone is simultaneously dehydrated and purified. Nothing is said about the first stages of distillation, for example, the separation of hydrocyanic acid, except that the crude product still contains 3.5% by weight of water, i.e. is saturated with water. In the following purification process, the water has to be forced up the column by azeotropic distillation and drawn off by decanting.

Figure 2:
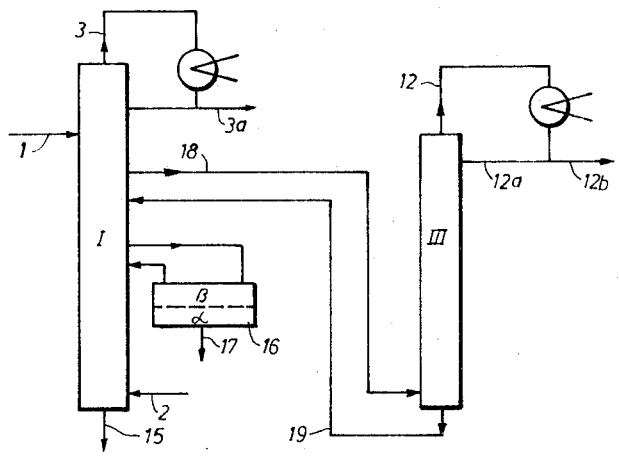

One object of this invention is the separation of acrylonitrile from a crude product containing the same and hydrocyanic acid and water, such as is formed from the oxidation of propylene in the presence of ammonia, without the above-mentioned disadvantages. This and still further objects will become apparent from the following description read in connection with the drawing in which FIG. 1 is a flow sheet showing an embodiment of the process in accordance with the invention; and FIG. 2 is a flow sheet showing an alternate embodiment of the process in accordance with the invention.

We have now found that a crude acrylonitrile which was obtained from the oxidation of propylene in the presence of ammonia and which is combined with water, hydrocyanic acid, acetone and other lower and higher boiling secondary products, can be purified with particular advantage by introducing the crude acrylonitrile into a distillation column I with a heated sump, drawing off hydrocyanic acid overhead, running off all the liquid flowing through the column from a sidestream at the lower end of the column by way of a decanter in which the deposited aqueous phase, containing acrylonitrile, acetone and other secondary products soluble in the water, is drawn off, recycling the organic phase to a lower, preferably the next lowest, plate of the column, introducing the sump product into a distillation column II with a heated sump, preferably beneath the backflow from a decanter, in which residual water together with dissolved acrylonitrile, acetone and other secondary products is separated and drawn off, removing acetone and other lower boiling secondary products at the head of this column, and feeding the dry acrylonitrile almost entirely free of lower boiling secondary products from the sump of column II to a column III in which the pure acrylonitrile is recovered in conventional manner.

The process according to the invention is now described with reference to FIGURE 1 of the accompanying drawing:

A crude product of acrylonitrile, hydrocyanic acid, water and acetone and other substances formed during the production of acrylonitrile from propylene (for example, acrolein and acetaldehyde) is introduced at 1 into a distillation column I at a point just above the middle of the column. The column has a sump which is heated by steam introduced through 2 and is equipped with 35 to 45 replaceable plates. A return flow required for separating the hydrocyanic acid is adjusted at the head of the column I in a quantity of from 1 to 3 times the head yield. The product drawn off overhead through 3 consists of 96 to 99% of hydrocyanic acid with from 1 to 4% of other organic compounds. The hydrocyanic acid is removed through 3a. Beneath the inlet, at about the 15th plate, all the liquid is removed from the column through 4 and is cooled to about 30 to 40° C. and passed through a layer or phase separator in the form of the decanter 5. The aqueous phase $\alpha$, which has formed at this point of the column because of the heterogeneous azeotropy of water with acrylonitrile, is removed through 6. In addition to water and acrylonitrile, this water phase contains a large proportion of the acetone introduced with the crude product and other secondary products such as acrolein, acrolein cyanhydrin and acetaldehyde cyanhydrin. The organic phase $\beta$ from the decanting step is recycled through 7 to the next lower plate of the column. The sump is heated with so much steam that the acrylonitrile removed at the sump contains less than 0.5% by weight of hydrocyanic acid, mainly in combined form. It still contains a maximum of 0.5% by weight of water.

The product run off from the sump of column I is introduced through 8 at about the 20th plate into a column II containing from 40 to 50 plates. The sump of column II is heated with steam through 9, and the waste vapours passing overhead through 12 are condensed and returned to the column as backflow through 12a. A small amount of the condensate including ammonia, if any, introduced with the crude product is run off through 12b in order to separate lower boiling secondary products. All the liquid is passed through a decanter 10 via 13 at about the 30th plate of the column II. The water phase $\alpha'$ is run off and the organic phase $\beta'$ recycled through 14, for example, to the next lower plate after being reheated at 14a. In addition to acrylonitrile, the water phase $\alpha'$ contains acetone and other secondary products such as acrolein and acrolein cyanhydrin. A crude acrylonitrile containing a maximum of 0.1% of water and 0.02% of acetone is removed through 15 from the sump of the column II. It is purified in known manner in a third column.

By virtue of the presence of the decanting step, the product issued from the sump of the column contains less than 0.5% by weight of water. Despite this, the amount of steam consumed is no higher than in conventional processes for distilling off the hydrocyanic acid. In accordance with the need for a very low hydrocyanic acid concentration in the pure acrylonitrile (less than 5 p.p.m.), there is only a little free hydrocyanic acid present in the lower part of the column. Accordingly, the vapour here consists almost entirely of acrylonitrile and water is aseotropic concentration (12 to 13% by weight of water), and on account of the limited solubility (at the boil 7 to 8% by weight of water in the acrylonitrile) the water on the plates forms two phases. This effect may be utilised for dehydration without any need for extra energy providing the aqueous phase is continuously run off from the column through a decanter at a suitable point. In order to obtain more effective dehydration, the liquid flowing into the decanting step is cooled to 30–40° C., because the solubility of water in acrylonitrile is governed by the temperature, after which the organic phase flowing back to the column, together with the condensate of the steam used for heating, is reheated to the boiling temperature. In conventional processes, however, the water is allowed to flow continuously back into the sump with the result that the "forced dehydration" effect is not utilised.

The sump product of the column I containing a maximum of 0.5% by weight of water is introduced into the column II below the sidestream to the separating bottle, residual dehydration being carried out in the same way as preliminary dehydration in the column II. The head yield of the column II consists of acetone, acrolein, cleavage products of the cyanhydrins, and other lower boiling impurities, in addition to acrylonitrile. The amount of steam required for heating the column II is governed solely by the amount of energy required to separate the organic secondary products in the crude nitrile and is not greater than in conventional processes for a secondary product column. No steam at all is required for separating the water in columns I and II. Accordingly, 330 to 370 kg. less of steam is consumed per ton of acrylonitrile produced than in conventional processes. Furthermore, no dehydration column is required.

By virtue of the double separation of the water phase by decanting, such an effective separation of acetone, acrolein, acetaldehyde cyanhydrin and acrolein cyanhydrin is obtained that the crude acrylonitrile at the sump of the column II runs off in a much purer form than in conventional processes.

The process can be simplified by combining the functions of columns I and II in a single column with the same number of plates (cf. FIGURE 2). To this end, only one decanter 16 is required to draw off the water phase 17. In order to separate secondary products such as acetone, acrolein and other lower boiling impurities, a small vaporous sidestream may be drawn off through 18 between the crude product inlet and the point at which the liquid is run off to the decanter, and introduced into the sump of a small column III, in which case the secondary products may be run off enriched, overhead through 12. The product 19 issuing from the sump of this column is recycled into the column I beneath the sidestream outlet.

It was surprising and by no means predictable that, in the separation of hydrocyanic acid from the mixture of acrylonitrile, water, hydrocyanic acid and acetone, most of the water can be removed by way of decanting without any need for more steam and without affecting the quality of the hydrocyanic acid, and that so much acetone, acetaldehyde and acrolein can be eliminated with the water phase, and that the acrylonitrile can be purified during subsequent distillation with much fewer means than in conventional processes.

EXAMPLE

A mixture of 3315.0 kg. of acrylonitrile, 1136.0 kg. of hydrocyanic acid, 415.0 kg. of water, 16.8 kg. of acetone, 49.3 kg. of acrolein and 39.0 kg. of acetaldehyde is fed hourly on to the 27th plate of the column I. 1112.2 kg. per hour of hydrocyanic acid with 34.9 kg. of other organic compounds and 2.9 kg. of water are drawn off overhead. 2300 kg. of backflow per hour run back into the column I. 395.6 kg./h. of water, 36.8 kg./h. of acrylonitrile, 6.6 kg./h. of acetone and 12.3 kg./h. of acrolein and 36.8 kg./h. of acetaldehyde are run off by decanting The sump of the column is heated with 1.65 t./h. of steam through rotary evaporators, 3274 kg./h. of acrylonitrile, 16.6 kg. of water, 10.0 kg. of acetone being drawn off and delivered on to the 20th plate of the column II. The sump of this column is heated with 1.0 t./h. of steam. 336.7 kg./h. of backflow flow in at the head of the column. 45.2 kg/h. of acrylonitrile, 0.4 kg./h. of water, 1.3 kg./h. of acetaldehyde, 5.3 kg./h. of acrolein and 3.2 kg. of hydrocyanic acid and 9.6 kg./h. of acetone are drawn off from the return flow container. 15.0 kg./h. of water, 1.2 kg./h. of acrylonitrile, 0.3 kg./h. of acetone and 0.5 kg./h. of acetaldehyde and acrolein are drawn off by decanting between the 30th and 31st plates of the column II. 3228.0 kg./h. of acrylonitrile, 1.2 kg./h. of water and 0.2 kg./h of acetone are run off from the sump of the column II to be purified by distillation.

What is claimed is:

1. A process for the purification of a crude product containing acrylonitrile, hydrocyanic acid, acetone and water comprising:
   introducing said product into a distillation column provided with a heated sump, withdrawing and condensing a vapor phase overhead comprising at least 96 weight percent hydrocyanic acid, recycling some and withdrawing some of the material so condensed, withdrawing from said heat sump acrylonitrile product containing less than 0.5 weight percent of hydrocyanic acid and water each withdrawing from said column at an intermediate point below the point of introduction of said crude product substantially all of the liquid descending thereto, cooling and allowing the liquid so withdrawn to separate into an upper organic phase and a lower aqueous-acetone phase, returning said organic phase to said column at a point below said intermediate point, and withdrawing as product said lower aqueous-acetone phase.

2. The process of claim 1 wherein the amount of the condensed overhead recycled is in the range of 1 to 3 times of the amount withdrawn.

3. The process of claim 1 wherein said acrylonitrile product is subjected to further purification in a second distillation column provided with a heated sump, vaporous product, a portion of which is condensed and recycled, being removed from the top thereof and a purified liquid acrylonitrile stream being removed from said heated sump, in which at a second intermediate point substantially all of the liquid descending thereto is withdrawn, cooled and decanted into a second organic phase and an aqueous phase, with said second organic phase being returned to said second column at a point below said second intermediate point and said aqueous phase being withdrawn.

4. The process of claim 3 wherein the organic phases returned to said columns are reheated to their boiling points, and they are reutrned to points immediately below the points of liquid withdrawal.

5. A process for the purification of a crude product containing acrylonitrile, hydrocyanic acid, acetone and water comprising: introducing said product into a first distillation column provided with a heated sump; withdrawing and condensing a vapor phase overhead comprising at least 96 weight hydrocyanic acid, recycling some and withdrawing some of the material so condensed, withdrawing from said heat sump acrylonitrile product containing less than 0.5 weight percent each of hydrocyanic acid and water, withdrawing from said first distillation column at a lower intermediate point below the point of introduction of said crude product substantially all of the liquid descending thereto, cooling and allowing the liquid so withdrawn to separate into an upper organic phase and a lower aqueous-acetone phase, returning said organic phase to said first distillation column at a point below said lower intermediate point, withdrawing as product said lower aqueous-acetone phase, withdrawing vapor from said first distillation column at an upper intermediate point above said lower intermediate point and below the point of introduction of said crude product and passing the same to a second distillation column, distilling lower boiling products therefrom and returning liquid from the sump of said second distillation column to said first distillation column.

6. The process of claim 5 wherein said liquid from the sump of said second distillation column is returned to said first distillation column at a point between said upper and lower intermediate points.

References Cited

UNITED STATES PATENTS

| | | | |
|---|---|---|---|
| 2,672,434 | 3/1954 | McFarlane | 203—82 |
| 3,051,630 | 8/1962 | Hadley et al. | 260—465.9 |
| 3,080,301 | 3/1963 | Fontana et al. | 203—97 |
| 3,149,055 | 9/1964 | Houghland | 203—98 |
| 3,196,085 | 7/1965 | Dippel | 203—97 |
| 3,264,197 | 8/1966 | Schonbeck et al. | 203—84 |
| 3,399,120 | 8/1968 | Lovett | 203—85 |

FOREIGN PATENTS 1,368,513 6/1964 France.

WILBUR L. BASCOMB, Jr., Primary Examiner

U.S. Cl. X.R.

23—151; 203—39, 96, 97, 98; 260—593, 465.3, 465.9